(12) United States Patent
Carver et al.

(10) Patent No.: US 6,321,790 B1
(45) Date of Patent: Nov. 27, 2001

(54) FLUID OSCILLATOR WITH AN EXTENDED SLOT

(75) Inventors: Andrew John Carver; Ibné Soreefan, both of Seneca, SC (US)

(73) Assignee: Schlumberger Industries, S.A., Montrouge (FR)

( * ) Notice: Subject to any disclaimer, the term of this patent is extended or adjusted under 35 U.S.C. 154(b) by 0 days.

(21) Appl. No.: 09/529,298

(22) PCT Filed: Oct. 12, 1998

(86) PCT No.: PCT/FR98/02182

§ 371 Date: Jun. 7, 2000

§ 102(e) Date: Jun. 7, 2000

(87) PCT Pub. No.: WO99/20905

PCT Pub. Date: Apr. 29, 1999

(30) Foreign Application Priority Data

Oct. 17, 1997 (FR) .................................................. 97 13145

(51) Int. Cl.[7] ........................................................ G01F 1/20
(52) U.S. Cl. ............................................. 137/833; 137/826
(58) Field of Search ................................... 137/833, 826, 137/842

(56) References Cited

U.S. PATENT DOCUMENTS 5,396,808 * 3/1995 Huang et al. ..................... 137/833 X
5,983,943 * 11/1999 Parry et al. ...................... 137/833 X

* cited by examiner

*Primary Examiner*—Kevin Lee
(74) *Attorney, Agent, or Firm*—Leonard W. Pojunas

(57) ABSTRACT

The invention relates to a fluidic oscillator that is symmetrical about a longitudinal plane of symmetry, the oscillator comprising an opening enabling a fluid to enter into an "oscillation" chamber in the form of a two-dimensional fluid jet oscillating transversely relative to said plane of symmetry, an obstacle occupying the major portion of said oscillation chamber and possessing a front wall provided with a cavity situated facing said opening and swept over by the fluid jet in oscillation, wherein two side walls extend on either side of the opening and form a nozzle inside the oscillation chamber extending towards the obstacle and having a longitudinal dimension that is less than the distance between the opening and the front wall of the obstacle.

11 Claims, 3 Drawing Sheets

FLUID OSCILLATOR WITH AN EXTENDED SLOT

The invention relates to a fluidic oscillator that is symmetrical about a longitudinal plane of symmetry P, the oscillator comprising an opening enabling a fluid to enter into an "oscillation" chamber in the form of a two-dimensional fluid jet oscillating transversely relative to said plane of symmetry P, an obstacle occupying the major portion of said oscillation chamber and possessing a front wall provided with a cavity situated facing said opening and swept over by the fluid jet in oscillation.

BACKGROUND OF THE INVENTION

Fluidic oscillators are well known and document WO 93/22627 gives an example which is shown in plan view in FIG. 1.

That oscillator 1 which is symmetrical about a longitudinal plane of symmetry P comprises an oscillation chamber 3 and an obstacle 5 housed inside the chamber.

The obstacle 5 has a front wall 7 in which a "front" cavity 9 is formed facing an opening 11.

The opening 11 defines a fluid inlet into the oscillation chamber 3 and it is suitable for forming a two-dimensional fluid jet that oscillates transversely about the longitudinal plane of symmetry P of the oscillator.

During operation of the fluidic oscillator, when the fluid jet encounters the front cavity 9 and sweeps over it during oscillation, main vortexes T1, T2 form on either side of the jet (FIG. 1) and alternate between being strong and weak, in phase opposition, and in relationship with the oscillation of the jet.

In FIG. 1, the vortex T1 occupies space that is much greater than the space occupied by the front cavity of the obstacle, and the pressure of this vortex is such that the jet is deflected into an extreme position in spite of the presence of the other vortex T2 located between the front wall 7 of the obstacle 5 adjacent to the cavity and the wall 13 facing the oscillation chamber and connected to the opening 11.

When the fluid jet is in this position, a portion of the flow from the jet is directed downstream from the obstacle, and another portion feeds the vortex T2 which grows larger and larger and whose pressure increases up to the moment when the pressure is sufficient to cause the jet to change over to the other side, into the opposite extreme position.

The jet thus oscillates from one extreme position to the other, and by detecting the frequency of oscillation of the jet, it is possible to determine the flow rate of the fluid, with the frequency being considered as being proportional to the flow rate.

To reduce errors in determining the fluid flow rate, the ratio of frequency of oscillation to flow rate must not vary too much as a function of flow conditions.

Unfortunately, under so-called "transition" conditions, i.e. when the Reynolds' numbers calculated for the flow at the opening 11 are situated at around 300, the Applicant has observed that a high pressure zone (vortex T3) appears in the vicinity of the base of the fluid jet on the side where the vortex T1 is to be found, together with other localized vortexes facing the front wall beneath the vortexes T1 and T3 in FIG. 1.

These vortexes reinforce the action of the vortex T1, and as a result, more time is required by the vortex T2 to acquire enough force to counterbalance the pressures exerted by T1 and T3, thereby reducing the frequency of oscillation and thus giving rise to errors in fluid flow rate determination.

Also, document U.S. Pat. No. 4,244,230 discloses a fluidic oscillator having a nozzle which extends towards a U-shaped obstacle defining an oscillation chamber. The longitudinal size of the side walls of the nozzle is equal to or greater than the distance between the ends of the walls of the obstacle and the apex of the downstream surfaces of two elements of semi-oval section disposed perpendicularly relative to the duct and whose main axes are parallel to the flow direction of the fluid. During operation of the fluidic oscillator, that type of nozzle affects the oscillation of the jet by considerably impeding the development of the vortex T1.

BRIEF SUMMARY OF THE INVENTION

The present invention seeks to remedy those problems by providing a fluidic oscillator that is symmetrical about a longitudinal plane of symmetry P, the oscillator comprising an opening enabling a fluid to enter into an "oscillation" chamber in the form of a two-dimensional fluid jet oscillating transversely relative to said plane of symmetry P, an obstacle occupying the major portion of said oscillation chamber and possessing a front wall provided with a cavity situated facing said opening and swept over by the fluid jet in oscillation, wherein the two side walls extend towards the obstacle on either side of the opening, prolonging it in such a manner as to form a nozzle inside the oscillation chamber and having longitudinal size that is strictly less than the distance between the opening and the front wall of the obstacle so that the ends of said walls are not too close to the cavity.

The nozzle forms a screen protecting the fluid jet against the vortexes situated in the high pressure zone close to the base of said jet and contributing to deflecting the jet excessively.

The fluid jet is therefore less subject to the influence of those disturbing vortexes than in the prior art.

The fluidic oscillator of the invention thus presents a frequency of oscillation under transition conditions that is higher than that of the prior art fluidic oscillator.

According to a characteristic, the side walls are substantially parallel to each other. Preferably, the longitudinal size Le of the side walls lies in the range 0.75b and $\underline{b}$, where $\underline{b}$ designates the transverse size or width of the opening.

For example, the longitudinal size Le of the side walls is substantially equal to $\underline{b}$.

Advantageously, the front wall of the obstacle has two essentially plane front surfaces on either side of the cavity of said obstacle, the planes of each of said surfaces being substantially perpendicular to the longitudinal plane of symmetry P.

Advantageously, the oscillation chamber possesses two wall portions situated on either side of the opening and comprising two surfaces disposed facing respective front surfaces of the obstacle and being substantially parallel thereto.

According to a characteristic of the invention, the cavity is defined by a surface which possesses, in the plane of oscillation of the fluid jet, firstly two straight portions that are substantially parallel to the longitudinal plane of symmetry P at locations where said surface meets each of said front surfaces, and secondly a portion of semicircular shape connected to said straight portions.

Preferably, the portion of the cavity farthest from the opening is situated at a distance Lo from the front wall of the obstacle lying in the range 2.2b to 2.5b, where $\underline{b}$ is the transverse size or width of the opening.

According to another characteristic of the invention, the distance L between the opening and the front wall of the obstacle lies in the range 2.8b to 3.2b, where b designates the transverse size or width of the opening.

According to a characteristic of the invention, the fluidic oscillator has at least two sensors for detecting speed or pressure variations in the fluid flow.

Advantageously, sensors for detecting speed variations of the fluid flow are disposed in the vicinity of the end of the nozzle.

BRIEF DESCRIPTION OF THE DRAWINGS

Other characteristics and advantages of the invention will appear on reading the following description, given purely by way of example and with reference to the accompanying drawings, in which.

DETAILED DESCRIPTION OF THE INVENTION

Figure 2:
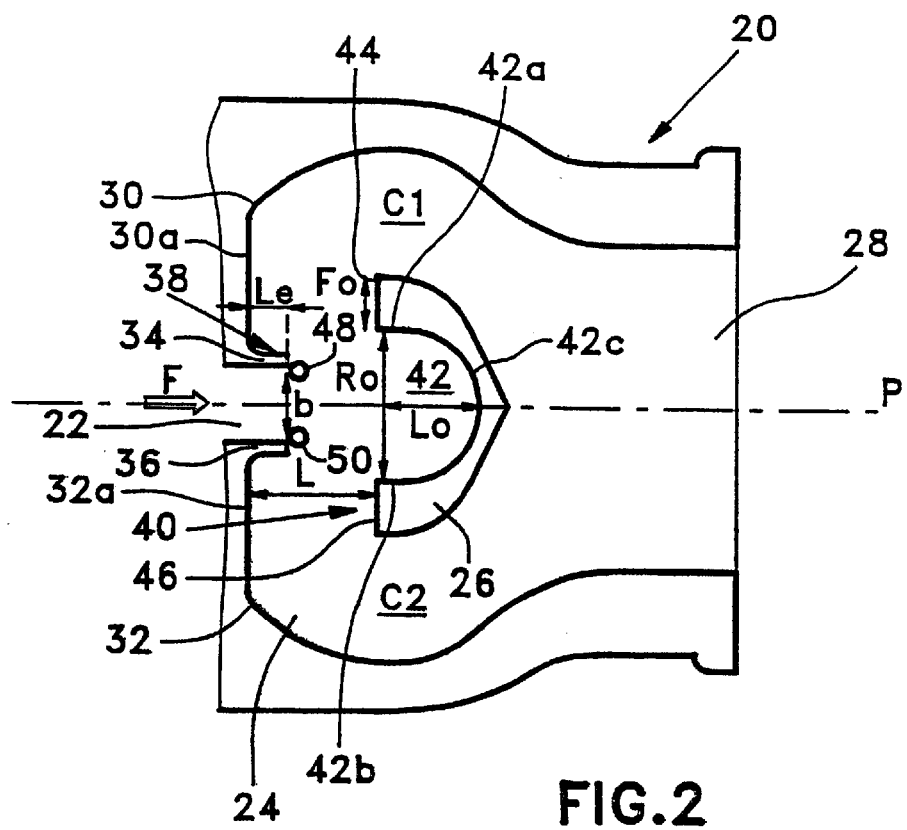
FIG. 2 is a plan view of a fluidic oscillator of the invention.

As shown in FIG. 2, and designated by overall reference 20, a fluidic oscillator is used together with a flow of gas in order to determine the flow rate and the volume of gas that has passed through said oscillator.

The fluidic oscillator 20 is symmetrical about a longitudinal plane of symmetry P on which there are aligned an inlet opening 22 enabling the flow to penetrate into an "oscillation" chamber 24 in the middle of which there is positioned an obstacle 26 which occupies the major portion of said chamber, and an outlet opening 28 for exhausting the flow of gas from the oscillation chamber.

The oscillation chamber is defined by two walls 30 and 32 that are symmetrical about the plane P and that interconnect the inlet and outlet openings.

The inlet opening 22 is implemented in the form of a slot whose transverse dimension or width b is constant, and whose greater dimension or "height" is contained in a plane perpendicular to the plane of FIG. 2.

The slot is extended in the longitudinal direction which corresponds to the direction in which the inlet and outlet openings 22 and 28 are aligned by means of two parallel side walls 34 and 36 which together form a nozzle 38. These side walls extend into the oscillation chamber 24 from respective ones of the walls 30 and 32 of the oscillation chamber on either side of the inlet opening, and they extend up the full height thereof.

The nozzle transforms the flow of gas passing through it and represented by arrow F into a two-dimensional fluid jet (the fluid jet remains more or less the same in a direction parallel to the height of the slot), which jet oscillates transversely relative to the longitudinal plane of symmetry P.

The walls 30 and 32 of the oscillation chamber 24 co-operate with the walls of the obstacle 26 to form two channels C1 and C2 which allow the gas flow to escape alternately via one or other channel to the outlet 28 of the fluidic oscillator.

The obstacle 28 has a front wall 40 in which there is formed a cavity 42 facing the nozzle 38 and swept by the gas jet during its oscillatory motion.

The front wall 40 of the obstacle 26 also has two "front" surfaces 44 and 46 which are situated symmetrically on either side of the cavity 42 and which are essentially plane.

The plane in which these front surfaces are located is substantially perpendicular to the longitudinal plane of symmetry P and to the flow direction at the slot 22.

The oscillation chamber 24 also has two wall portions 30a and 32a which are disposed symmetrically on either side of the slot 22 facing the front surfaces 44 and 46.

The wall portions 30a and 32a posses surfaces which are parallel to the front surfaces 44 and 46.

Thus, the vortexes which form on either side of the jet will be positioned in the two empty spaces situated between the front surfaces 44 and 46 and the respective corresponding surfaces of the wall portions 30a and 32a. These vortexes will thus develop in quasi-free manner between said surfaces.

It is not necessary for the transverse dimension or "width" Fo of the front surfaces 44 and 46 to be large to ensure that said surfaces perform their function, and a width Fo lying in the range 0.8b to 1.4b, and equal to 1.2b, for example, is quite satisfactory.

The distance L between the front surfaces 44 and 46 and the surfaces of the wall portions 30a and 32a must not be too small so as to leave empty spaces that are large enough to allow the vortexes to develop.

If the distance L is too small, e.g. less than 2.8b, then problems can arise under laminar conditions since the pressure of the vortexes increases too quickly, thereby causing the jet to change over too soon.

By way of example, the distance L is equal to 3b.

In the plane of FIG. 2, the cavity 42 presents a surface whose profile enables the gas jet to be guided into said cavity during its oscillation, and prevents any phenomenon of recirculation arising inside said cavity.

In the plane of FIG. 2, the surface of the cavity is defined by two straight portions 42a, 42b which are substantially parallel to the longitudinal plane of symmetry P and which meet the two front surfaces 44, 46 respectively at the opening of the cavity.

The surface of the cavity is also defined by a portion of semicircular shape 42c which is connected to the straight portions and which thus forms the end wall of the cavity. Thus, the flows coming from the jet, which split on meeting the surface of the cavity, and which are guided by said surface travel in a direction which is substantially parallel to the plane P on leaving said cavity.

Nevertheless, other shapes are also suitable providing they perform the functions mentioned above.

For example, the profile of the surface could be parabolic.

In addition, the fact that the surfaces of the wall portions 30a and 32a are parallel to the front surfaces 44, 46 and that the flow leaving the cavity 42 travels in a direction that is substantially perpendicular to said surfaces, makes it possible to avoid imparting an angle of incidence to the flow which meets said surfaces of the wall portions 30a and 32a that is too remote from the normal to said surfaces under all flow rates.

An angle of incidence too remote from the normal to said surfaces would have the effect of changing the size of the vortex positioned between one of the front surfaces and the corresponding facing surface of the wall portions 30a and 32a.

Figure 1:
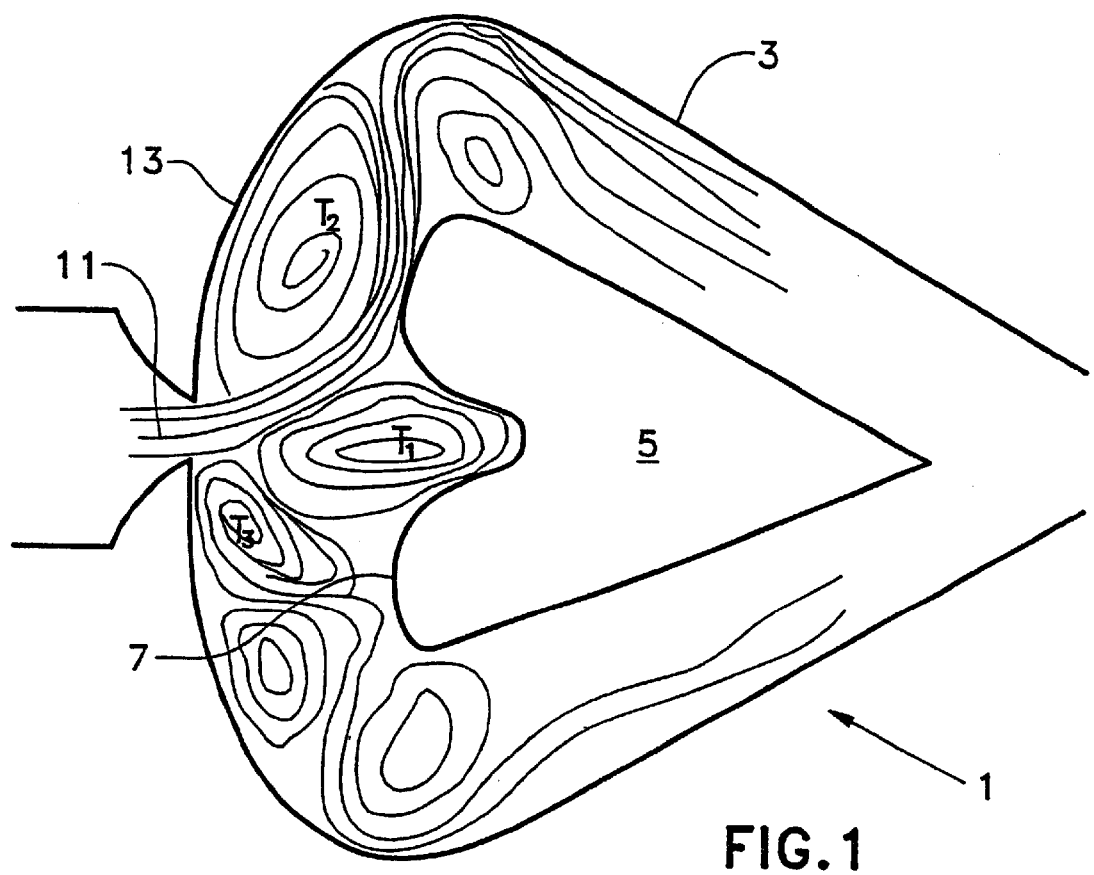
FIG. 1 is a plan view of a prior art fluidic oscillator.

It should also be observed that the cavity is deeper than the cavity of the prior art fluidic oscillator shown in FIG. 1 so as to enable the shape of the main vortex T1 to be fixed regardless of flow conditions (laminar, transition, turbulence). Thus, even at very low flow rates, i.e. for Reynolds' numbers of about 50, a vortex can develop in said cavity in similar manner to the vortex which develops under turbulent conditions.

This makes it possible to measure the frequency of oscillation of the jet even at Reynolds' numbers of about 50, which is not possible with the cavity of the oscillator shown in FIG. 1.

The portion of the cavity which is farthest from the slot 22 is situated at a distance Lo from the front surfaces 44, 46 which lie in the plane of the opening of said cavity, where Lo lies in the range 2.2b to 2.5b, and is equal to 2.4b, for example.

The cavity 42 must not be too deep (e.g. Lo=3b) in order to avoid reinforcing the action of the vortex T1 on the jet at low flow rates since that would considerably reduce the frequency of oscillation of said jet.

The width Ro of the cavity 42 at its opening between the two straight portions 42a and 42b lies in the range 3.4b to 3.8b, and is equal to 3.6b, for example.

Figure 3:
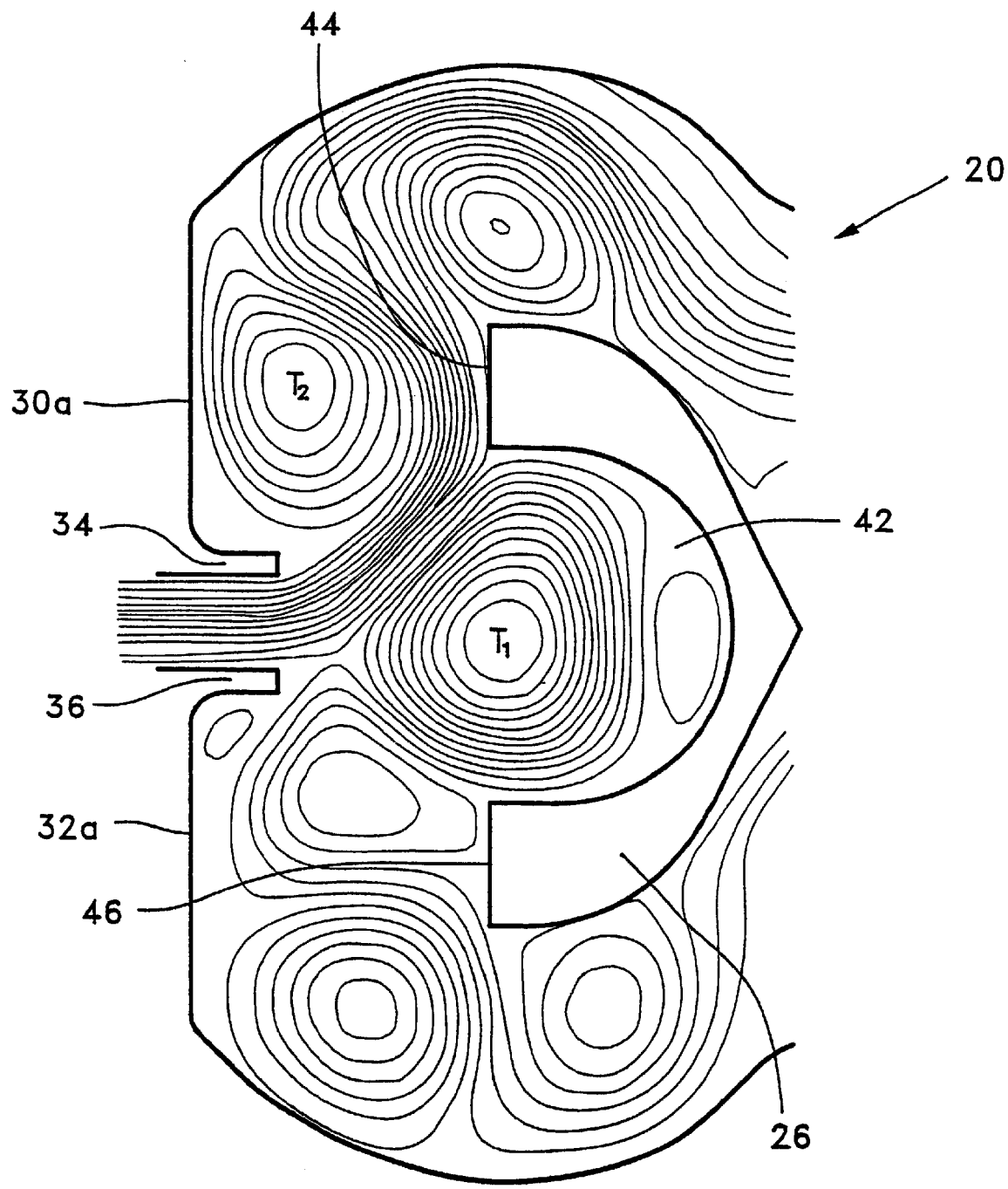
FIG. 3 is a plan view of the FIG. 2 fluidic oscillator on which the main vortexes T1 and T2 have been shown for an extreme position of the fluid jet.

By lengthening the slot 22 by means of the nozzle 38, when the fluid jet is deflected into a position as shown in FIG. 3, the jet is isolated from the disturbing action of the vortexes situated between the front face 46 and the corresponding surface of the wall portion 32a in its portion that is channeled by the walls 34 and 36. The base of the jet is thus stiffened, thereby enabling it, under transition conditions, to withstand the disturbing action of these interfering vortexes and thus to have a frequency of oscillation that is higher than in the prior art (FIG. 1).

In addition, with the configuration of the fluidic oscillator of the invention as shown in FIGS. 2 and 3, the jet is deflected more "sharply" in its free portion than it is in the prior art and it can thus be seen that facing the front surface 44 the jet deflects towards the corresponding surface of the wall portion 30a, thereby leaving less room for the vortex T2 to develop.

This explains why the vortex T2 is fed with pressure more quickly than in the prior art, so the pressure exerted by T1 is compensated more quickly, thereby causing the jet to change over sooner.

The longitudinal size Le of the side walls 34, 36 must be strictly less than the distance L in order to ensure that said walls do not come too close to the cavity 42 which will be completely occupied by one of the vortexes, T1, while the other vortex, T2, is located in the empty space situated between the front surface 44 and the facing surface of the wall portion 30a (FIG. 3).

Side walls that are too long (e.g. Le=2b) would impede development of the vortex T1 and would thus affect oscillation of the jet. The development of the vortex T2 would also be modified since the jet would then remain inside the cavity, thus causing T2 to grow in a restricted space.

The dimension Le advantageously lies in the range 0.75b to b, and is equal to 0.9b, for example.

In addition, the presence of these walls isolates the base of the fluid jet from return flows that could give rise to errors in detecting the frequency of oscillation of the jet.

As shown in FIG. 2, the side walls 34 and 36 of the nozzle 38 are of constant thickness in the length direction Le with the exception of where said side walls connect to the wall portions 30a and 32a where the surface of the side walls forms a small concave portion. It is important for the side walls to occupy as little space as possible so as to avoid impeding development of the main vortexes T1 and T2.

Thus, the side walls 34 and 36 can be in the form of two very thin straight blades which suffice to guide the fluid jet and to protect it against disturbances.

The configuration of the above-described fluidic oscillator enables vortexes T1 and T2 to be obtained that are of a shape that varies very little as a function of flow conditions, thereby ensuring good measurement accuracy.

The fluidic oscillator of FIG. 2 enables the flow rate of the gas passing through it to be measured by means of two pressure takeoffs situated at the extreme points of the sweep of the gas jet inside the cavity 42. These pressure takeoffs are connected to known devices enabling the frequency of oscillation of the jet to be measured. Prior calibration enables the frequency to be related to flow rate.

Thermal or ultrasound sensors can also be used to detect variations in the flow speed of the jet and thus to measure the frequency of oscillation of the jet.

Such sensors can also be placed between the nozzle 38 and the obstacle 26 in the top wall (not shown in FIG. 2) which forms the cover of the fluidic oscillator, or indeed in the bottom wall of said fluidic oscillator (which constitutes the background of FIG. 2).

The locations of such sensors 48, 50 are represented by circles in FIG. 2.

It should be observed that in the plane of FIG. 2, the sensors 48 and 50 are advantageously placed in front of the end of the nozzle 38 and are spaced apart by a distance that is less than or equal to the spacing between the side walls 34 and 36 so as to be located in the fluid flow.

At low flow rates, a boundary layer develops along the inside surfaces of the side walls 34 and 36, thereby imparting a speed gradient to the jet at the outlet from the nozzle 38 that is steeper than the gradient obtained at the base of the jet situated at the opening 11 in FIG. 1, thereby causing the signal that is detected by the sensors to be stronger than in the prior art.

Thus, detecting the frequency of oscillation of the fluid jet at low flow rates by means of the sensors 48 and 50 placed in front of the nozzle 38 is made easier than it is in the prior art fluidic oscillator.

In addition, at high flow rates, sensors positioned in this way are protected from disturbances due to return flows which might otherwise be detected by such sensors.

Figure 4:
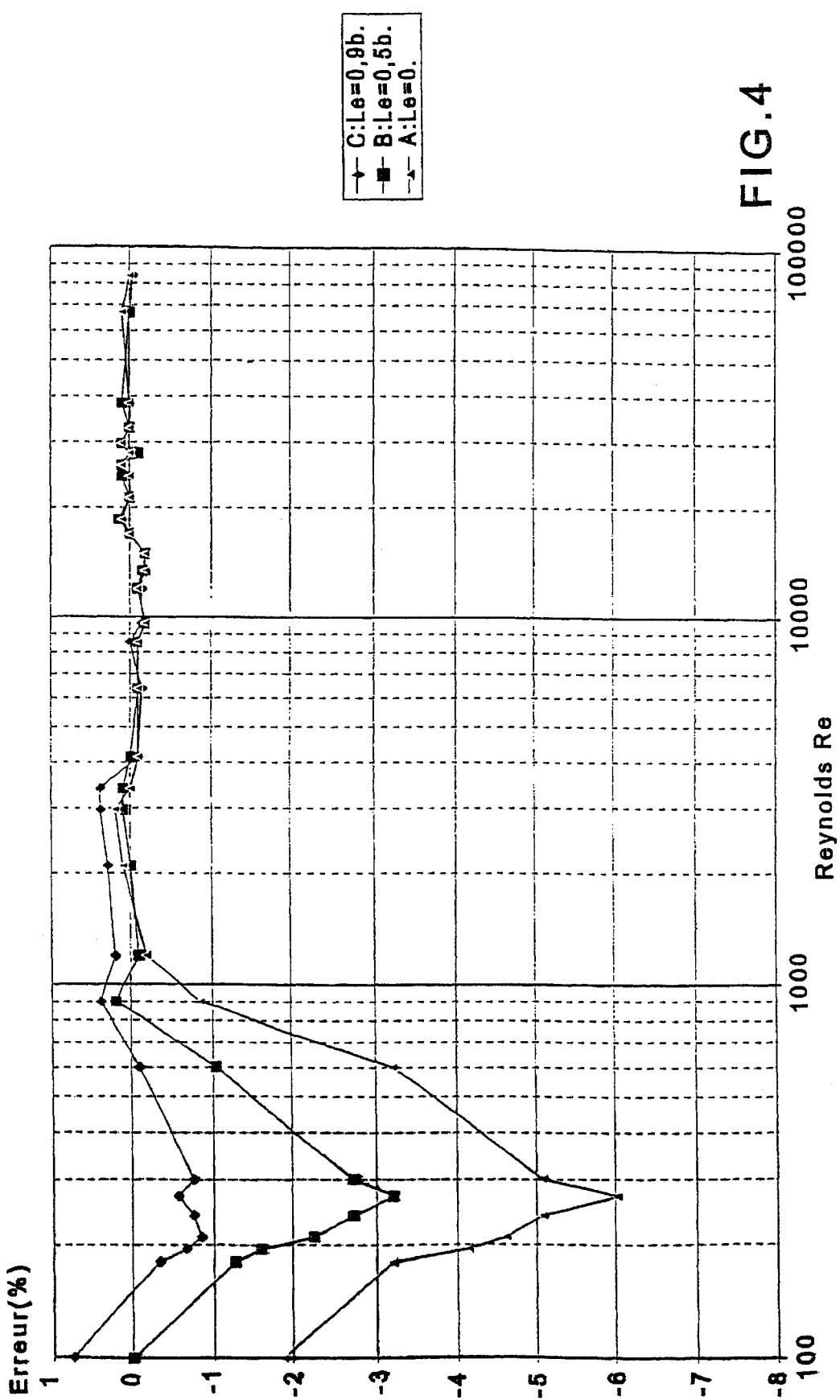
FIG. 4 is a graph showing linearity curves for the fluidic oscillator FIG. 2 with and without the nozzle 38.

FIG. 4 gives three linearity curves for fluidic oscillators having three distinct configurations: curve A corresponds to the oscillator of FIG. 2 without the nozzle 38, while curves B and C correspond to the oscillator of FIG. 2 with two different lengths of nozzle 38, one having a length of 0.5b (curve B), and the other having a length of 0.9b (curve C).

For these oscillators, the width b of the slot 22 was equal to 19 mm, and the other dimensions were as defined above as a function of said width b.

Thus, the presence of a nozzle inside the oscillation chamber has the effect of increasing the frequency of oscillation of the jet under transition conditions, and thus of correcting the linearity curve of the fluidic oscillator.

By lengthening the nozzle slightly, this effect increases likewise, but it is nevertheless appropriate to avoid increasing its longitudinal size excessively since the changeover frequency of the jet then runs the risk of increasing considerably under laminar conditions.

Such a fluidic oscillator can be applied equally well to gases and to liquids (water, vehicle fuels).

What is claimed is:

1. A fluidic oscillator that is symmetrical about a longitudinal plane of symmetry, the oscillator comprising an opening enabling a fluid to enter into an oscillation chamber in the form of a two-dimensional fluid jet oscillating transversely relative to said plane of symmetry, an obstacle occupying a major portion of said oscillation chamber and possessing a front wall provided with a cavity situated facing said opening and swept over by the fluid jet in oscillation, wherein two side walls extend towards the obstacle on either side of the opening, prolonging said opening in such a manner as to form a nozzle inside the oscillation chamber and having longitudinal size that is strictly less than the distance between the opening and the front wall of the obstacle so that the ends of said walls are not too close to the cavity.

2. A fluidic oscillator according to claim 1, in which the side walls are substantially parallel to each other.

3. A fluidic oscillator according to claim 1, in which the side walls have a longitudinal size Le lying in the range 0.75×b and 1×b, where b designates the transverse size of the opening.

4. A fluidic oscillator according to claim 3, in which the longitudinal size Le of the side walls is substantially equal to b.

5. A fluidic oscillator according to claim 1, in which the front wall of the obstacle has two essentially plane front surfaces on either side of the cavity of said obstacle, the planes of each of said surfaces being substantially perpendicular to the longitudinal plane of symmetry.

6. A fluidic oscillator according to claim 5, in which the oscillation chamber possesses two wall portions situated on either side of the opening and comprising two surfaces disposed facing respective front surfaces of the obstacle and being substantially parallel thereto.

7. A fluidic oscillator according to claim 5, in which the cavity is defined by a surface which possesses, in the plane of oscillation of the fluid jet, firstly two straight portions that are substantially parallel to the longitudinal plane of symmetry at locations where said surface meets each of said front surfaces, and secondly a portion of semicircular shape connected to said straight portions.

8. A fluidic oscillator according to claim 1, in which the portion of the cavity farthest from the opening is situated at a distance Lo from the front wall of the obstacle lying in the range 2.2×b to 2.5×b, where b designates the transverse size of the opening.

9. A fluidic oscillator according to claim 1, in which there is a distance L between the opening and the front wall of the obstacle lying in the range 2.8×b to 3.2×b, where b designates the transverse size of the opening.

10. A fluidic oscillator according to claim 1, comprising at least two sensors for detecting speed or pressure variations in the fluid.

11. A fluidic oscillator according to claim 10, in which sensors for detecting speed variations of the fluid flow are disposed in the vicinity of the end of the nozzle.

* * * * *